(12) United States Patent
Lefaudeux et al.

(10) Patent No.: US 11,507,179 B2
(45) Date of Patent: Nov. 22, 2022

(54) SYSTEMS AND METHODS FOR PREDICTING LOWER BODY POSES

(71) Applicant: Meta Platforms Technologies, LLC, Menlo Park, CA (US)

(72) Inventors: Benjamin Antoine Georges Lefaudeux, Menlo Park, CA (US); Samuel Alan Johnson, Redwood City, CA (US); Carsten Sebastian Stoll, San Francisco, CA (US); Kishore Venkatehsan, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/024,591

(22) Filed: Sep. 17, 2020

(65) Prior Publication Data
US 2022/0083125 A1    Mar. 17, 2022

(51) Int. Cl.
| | | |
|---|---|---|
| *G06F 3/01* | (2006.01) | |
| *G06N 20/00* | (2019.01) | |
| *G06F 3/0346* | (2013.01) | |
| *G06T 7/70* | (2017.01) | |
| *G06N 5/04* | (2006.01) | |

(52) U.S. Cl.
CPC .............. *G06F 3/011* (2013.01); *G06N 5/04* (2013.01); *G06N 20/00* (2019.01); *G06T 7/70* (2017.01); *G06F 3/0346* (2013.01); *G06T 2207/20081* (2013.01); *G06T 2207/30196* (2013.01)

(58) Field of Classification Search
CPC ......... G06F 3/011; G06F 3/0346; G06N 5/04; G06N 20/00; G06T 2207/20081; G06T 2207/30196
See application file for complete search history.

(56) References Cited

U.S. PATENT DOCUMENTS

| | | |
|---|---|---|
| 6,700,552 B2 | 3/2004 | Kollin et al. |
| 7,232,071 B2 | 6/2007 | Lewis et al. |
| 7,558,455 B2 | 7/2009 | Weir et al. |

(Continued)

FOREIGN PATENT DOCUMENTS

| | | |
|---|---|---|
| WO | 2020060666 A1 | 3/2020 |
| WO | 2020097631 A1 | 5/2020 |

OTHER PUBLICATIONS

Cha Y.W., et al., "Towards Fully Mobile 3D Face, Body, and Environment Capture Using Only Head-Worn Cameras," IEEE Transactions on Visualization and Computer Graphics, 2018, vol. 24, No. 11, 12 Pages.

(Continued)

*Primary Examiner* — Mihir K Rayan
(74) *Attorney, Agent, or Firm* — Baker Botts L.L.P.

(57) ABSTRACT

A computing system may receive sensor data from one or more sensors coupled to a user. Based on this sensor data, the computing system may generate an upper body pose that corresponds to a first portion of a body of the user, which may comprise a head and an arm of the user. The computing system may process the upper body pose of the user using a machine learning model to generate a lower body pose that corresponds to a second portion of the body of the user, which may comprise a leg of the user. The computing system may generate a full body pose of the user based on the upper body pose and the lower body pose.

19 Claims, 10 Drawing Sheets

(56) References Cited

U.S. PATENT DOCUMENTS

| | | | |
|---|---|---|---|
| 10,056,020 | B2 | 8/2018 | Chi et al. |
| 10,168,537 | B1 | 1/2019 | Parsons |
| 11,100,664 | B2 | 8/2021 | Wantland et al. |
| 11,386,988 | B2 | 7/2022 | Johnsson et al. |
| 2008/0073163 | A1 | 3/2008 | Weir et al. |
| 2015/0192413 | A1* | 7/2015 | Bellusci ............... A61B 5/1114 |
| | | | 702/152 |
| 2018/0052325 | A1 | 2/2018 | Bohn |
| 2018/0070864 | A1* | 3/2018 | Schuster ............ A61B 5/1128 |
| 2018/0120559 | A1 | 5/2018 | Yeoh et al. |
| 2019/0102927 | A1* | 4/2019 | Yokokawa ............. G06T 13/40 |
| 2020/0008712 | A1* | 1/2020 | Takenaka ............ A61H 1/0262 |
| 2020/0218889 | A1* | 7/2020 | Masui .................... G06V 20/64 |
| 2020/0226814 | A1 | 7/2020 | Tang et al. |
| 2020/0371584 | A1 | 11/2020 | Zhao et al. |

OTHER PUBLICATIONS

International Search Report and Written Opinion for International Application No. PCT/US2021/045054, dated Dec. 2, 2021, 10 pages.

International Search Report and Written Opinion for International Application No. PCT/US2021/046062, dated Dec. 3, 2021, 10 pages.

Nakao A., et al., "Integrated Waveguide-Type Red-Green-Blue Beam Combiners for Compact Projection-Type Displays," Optics Communications, May 23, 2014, vol. 330, pp. 45-48.

Piggott A.Y., et al., "Inverse Design and Demonstration of a Compact and Broadband On-Chip Wavelength Demultiplexer," Physics Optics, Apr. 1, 2015, 15 pages.

Rhodin H., et al., "EgoCap: Egocentric Marker-Less Motion Capture with Two Fisheye Cameras," ACM Transactions on Graphics, Nov. 2016, vol. 35, No. 6, Article 162, pp. 162:1-162:11.

Yoshida T., et al., "Polarization-Insensitive Vertically Curved Si Surface Optical Coupler Bent by Ion Implantation," IEEE Photonics Technology Letters, Oct. 15, 2020, vol. 32 (20), pp. 1319-1322.

Yu S., et al., "Integrated Quadratic Reflectors for High-Performance Optical Interconnects," 2020 IEEE Photonics Conference, Sep. 28, 2020, 2 pages, Retrieved from the Internet: URL: https://ieeexplore.ieee.org/document/9252220.

* cited by examiner

SYSTEMS AND METHODS FOR PREDICTING LOWER BODY POSES

TECHNICAL FIELD

This disclosure generally relates to predicting lower body poses of a user.

BACKGROUND

Machine learning may be used to enable machines to automatically detect and process objects. In general, machine learning typically involves processing a training data set in accordance with a machine-learning model and updating the model based on a training algorithm so that it progressively "learns" the features in the data set that are predictive of the desired outputs. One example of a machine-learning model is a neural network, which is a network of interconnected nodes. Groups of nodes may be arranged in layers. The first layer of the network that takes in input data may be referred to as the input layer, and the last layer that outputs data from the network may be referred to as the output layer. There may be any number of internal hidden layers that map the nodes in the input layer to the nodes in the output layer. In a feed-forward neural network, the outputs of the nodes in each layer—with the exception of the output layer—are configured to feed forward into the nodes in the subsequent layer.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Embodiments described herein relate to methods of generating one or more body poses of a user associated with one more components of an artificial reality system. To enable a computing system to generate an accurate pose of one or more joints that comprise a body pose, the computing system may receive one or more sensor data or image data from one or more components of the artificial reality system, for example sensor data from motion-tracking sensors or image data received from one or more cameras. Using various techniques described herein, the image data and sensor data permits a computing system to accurately generate an upper body pose of a user based on the one or more sensor data or image data associated with an artificial reality system. However, while this sensor data and image data is effective for generating upper body poses of a user, it is often of limited use when generating a lower body poses of the user.

To remedy this problem, particular embodiments described herein utilize a machine-learning model to generate a lower body pose in response to receiving a generated upper body pose of a user. In particular embodiments, the machine-learning model may be trained to receive the generated upper body pose and generate a corresponding lower body pose. In particular embodiments, the machine-learning model may be based on a Generative Adversarial Network (GAN) and trained using one or more training poses. Based on these training poses, the machine-learning model may learn how to produce realistic lower body poses. Once trained, the machine-learning model may receive generated upper body poses and output a corresponding lower body pose or full body pose that may be used in a variety of applications. For example, an outputted full body pose can be used to generate an avatar of a user in a virtual reality or artificial reality space.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
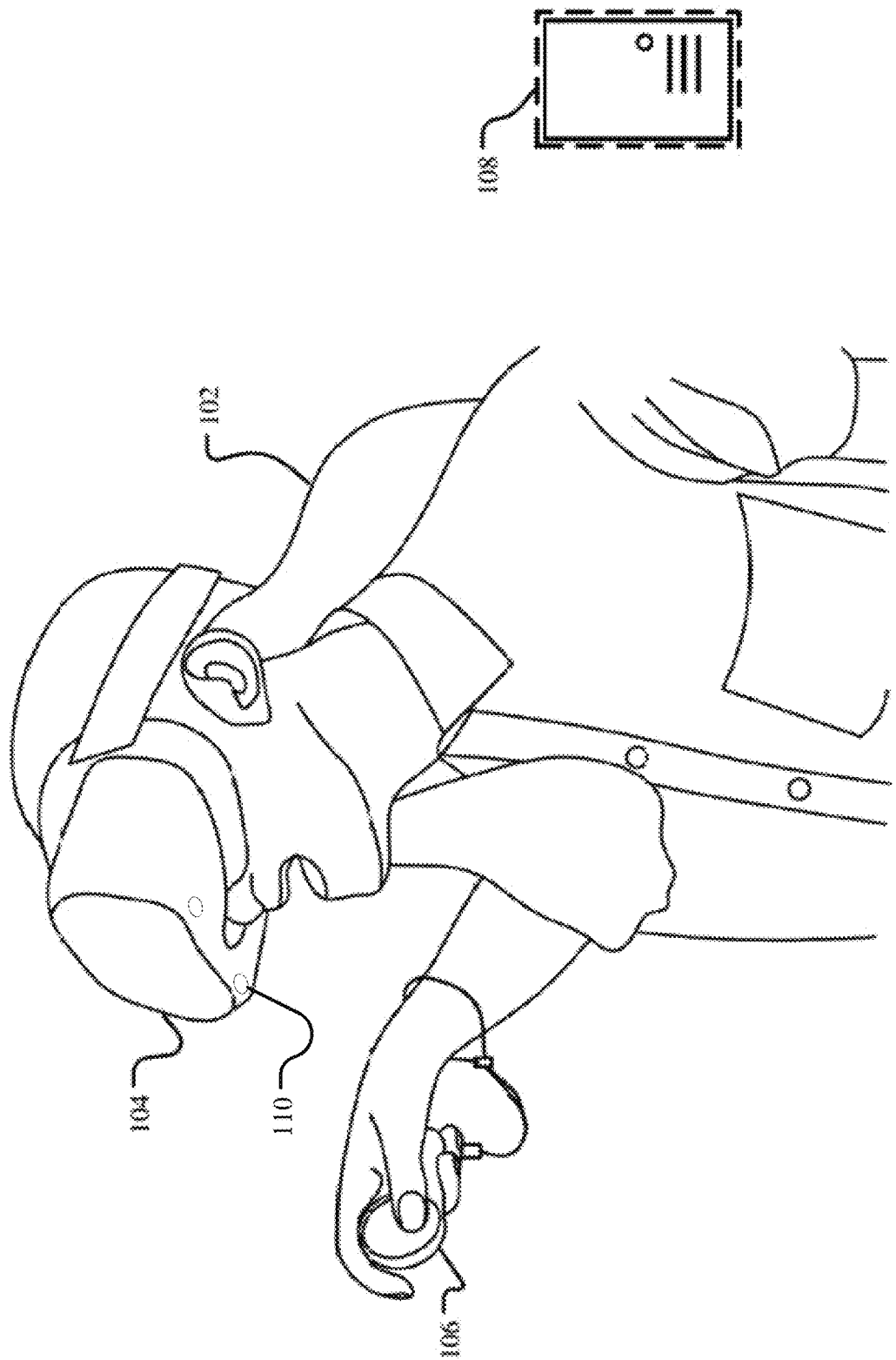
FIG. 1 illustrates an example artificial reality system.

FIG. 1 illustrates an example artificial reality system 100. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may comprise one or more cameras 110 which can capture images and videos of environments. The headset 104 may include an eye tracking system to determine a vergence distance of the user 102. A vergence distance may be a distance from the user's eyes to objects (e.g., real-world objects or virtual objects in a virtual space) that the user's eyes are converged at. The headset 104 may be referred to as a head-mounted display (HMD). In particular embodiments computing system 108 may determine a pose of headset 104 associated with user 102. The headset pose may be determined by utilizing any of the sensor data or image data received by the computing system 108.

One or more controllers 106 may be paired with the artificial reality system 100. In particular embodiments one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user may perform certain functions via the controller. The one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

In particular embodiments the computing system 108 may receive sensor data from one or more sensors of artificial reality system 100. In particular embodiments the one or more sensors may be coupled to user 102. In particular embodiments, the one or more sensors may be associated with the headset 104 worn by the user. For example and not by way of limitation, the headset 104 may include a gyroscope or inertial measurement unit that tracks the user's real-time movements and output sensor data to represent or describe the movement. The sensor data provided by such motion-tracking sensors may be used by the VR application to determine the user's current orientation and provide that orientation to the rendering engine to orient/reorient the virtual camera in the 3D space. As another example and not by way of limitation, the one or more controllers 106 may include inertial measurement units (IMUs) and infrared (IR) light emitting diodes (LEDs) configured to collect and send IMU sensor data to the computing system 108. In particular embodiments the computing system 108 may utilize one or more sensor data with one or more tracking techniques, for example and not by way of limitation, SLAM tracking or IR-based tracking, to determine a pose of one or more components of artificial reality system 100.

In particular embodiments the computing system 108 may receive one or more image data from one or more components of artificial reality system 100. In particular embodiments this image data comprises image data captured from one or more cameras 110 associated with artificial reality system 100. For example, FIG. 1 depicts one or more cameras 110 coupled within headset 104. These one or more cameras may be positioned to capture one or more images associated with various perspectives, for example and not by way of limitation, one or more cameras associated with headset 104 that face downward (e.g. towards the feet of user 102 while standing).

In particular embodiments computing system 108 may determine a controller pose of one or more controllers 106 associated with user 102. The controller pose associated with user 102 may be determined by utilizing sensor data or image data received by the computing system 108, and utilizing one or more techniques, for example and not by way of limitation, computer vision techniques (e.g., image classification). Methods for determining controller poses are described further in U.S. application Ser. No. 16/734,172, filed Jan. 3, 2020, entitled "Joint Infrared and Visible Light Visual-Inertial Object Tracking," hereby incorporated by reference in its entirety.

In particular embodiments the computing system 108 may control the headset 104 and the one or more controllers 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 2:
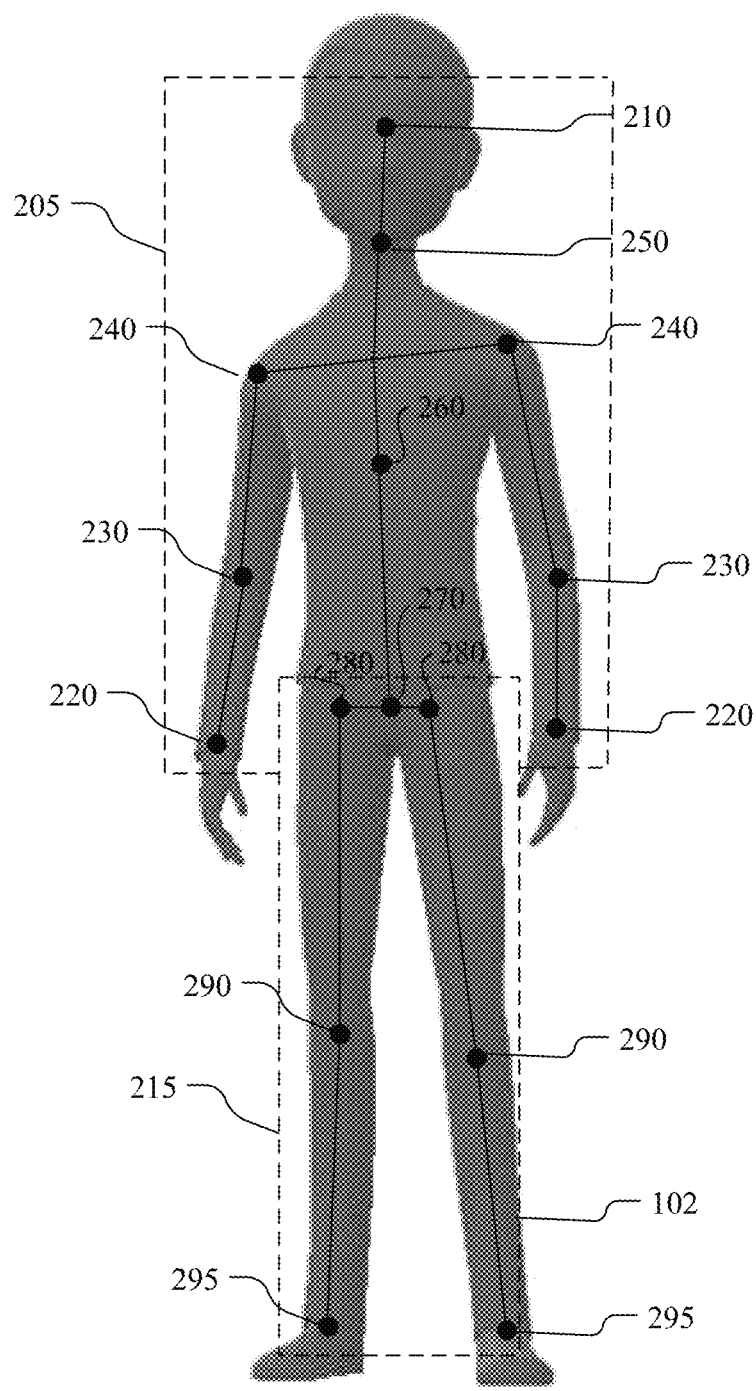
FIG. 2 illustrates a sample body pose associated with user.

FIG. 2 illustrates a sample full body pose associated with user 102. In particular embodiments, computing system 108 may generate a full body pose 200 associated with user 102, comprising an upper body pose 205 and a lower body pose 215. Full body pose 200 associated with user 102 may attempt to replicate a position and orientation of one or more joints of a user 102 utilizing artificial reality system 100 at a particular time. In particular embodiments, full body pose 200 associated with user 102 comprises a skeletal frame of inverse kinematics ("skeleton" or "body pose"), which may comprise a list of one or more joints.

Upper body pose 205 may correspond to a portion of the body of the user 102. In particular embodiments upper body pose 205 may correspond to a portion of the body of user 102 that comprises at least a head and arm of the user 102. In particular embodiments upper body pose 205 may be generated by determining a plurality of poses corresponding to a plurality of predetermined body parts or joints of the user 102, for example, the head or wrist of the user 102. In particular embodiments the upper body pose 205 may further comprise, for example and not by way of limitation, a pose of one or more joints associated with the upper body of user 102, for example and not by way of limitation, a head pose 210, a wrist pose 220, an elbow pose 220, a shoulder pose 240, a neck pose 250, or an upper spine pose 260.

Lower body pose 215 may correspond to a portion of the body of user 102. In particular embodiments lower body pose 215 may correspond to a portion of the body of user 102 that comprises at least a leg of the user 102. In particular embodiments the lower body pose 215 may further comprise, for example and not by way of limitation, a joint pose of one or more joints associated with the lower body of user 102, for example and not by way of limitation, a lower spine pose 270, a hip pose 280, a knee pose 290, or an ankle pose 295.

In particular embodiments the one or more joints poses comprising the full body pose 200, the upper body pose 205, or the lower body pose 215 may be represented through, for example and not by way of limitation, a subset of parameters that represent a position and/or orientation of each joint in a body pose 200. The non-linear solver may parametrize each joint pose associated with user 102 by 7 degrees of freedom: 3 translation values (e.g., x, y, z), 3 rotation values (e.g., Euler angles in radians), and 1 uniform scale value. In particular embodiments these parameters may be represented using one or more coordinate systems, for example and not by way of limitation, via an absolute global coordinate system (e.g., x, y, z) or via a localized coordinate system relative to a parent joint, for example and not by way of limitation, a head joint.

In particular embodiments full body pose 200, upper body pose 205, or lower body pose 215, and one or more joint poses comprising the full body pose 200, upper body pose 205, or lower body pose 215, may be determined using received sensor or image data from one or more components of artificial reality system 100. In particular embodiments one or more joint poses comprising full body pose 200 may be generated using a combination of one or more techniques, for example and not by way of limitation localization techniques (e.g., SLAM), machine learning techniques (e.g., a neural network), known spatial relationships with one or more artificial reality system components (e.g., a known spatial relationship between headset 104 and head pose 210), visualization techniques (e.g., image segmentation), or optimization techniques (e.g., a non-linear solver). In particular embodiments one or more of these techniques may be utilized separately or in conjunction with one or more other techniques. This full body pose 200 associated with user 102 may be useful for a variety of applications as described herein.

In particular embodiments, the computing system 108 may generate an upper body pose 205 of the user 102. The upper body pose 205 may be generated based on at least sensor data or image data. In particular embodiments, computing system 108 may determine upper body pose 200 utilizing one or more poses corresponding to a plurality of predetermined body parts of user 102, for example and not by way of limitation, a joint pose of one or more joints comprising upper body pose 205 (e.g., a head pose 210 or a wrist pose 220).

In particular embodiments the one or more poses may comprise a head pose 210 associated with the user 102. The head pose 210 may comprise a location and an orientation of the head joint of user 102 while wearing the headset 104. The head pose 210 associated with user 102 may be determined by computing system 108 utilizing any of the sensor data and/or image data received by the computing system 108. In particular embodiments this head pose 210 associated with user 102 may be determined based on the pose of the headset 104 and a known spatial relationship between the headset 104 and the head of user 102. In particular embodiments the head pose 210 associated with user 102 may be determined based on sensor data associated with headset 104 worn by user 102.

In particular embodiments the one or more poses may comprise a wrist pose 220 associated with the user 102. The wrist pose 220 may comprise a location and an orientation of a wrist joint of user 102 while interacting with artificial reality system 100. The wrist pose 220 associated with user 102 may be determined by computing system 108 utilizing any of the sensor data and/or image data received by the computing system 108. In particular embodiments the image data may comprise one or more images captured by the headset 104 worn by the user 102. These one or more images may depict a wrist of the user 102, or a device held by user 102, (e.g., a controller 106). In particular embodiments the computing system 108 may use one or more computer vision techniques, for example and not by way of limitation, image classification or object detection, to determine the wrist pose 220 utilizing the one or more images. In particular embodiments the wrist pose 220 may be determined based on the controller pose and a known spatial relationship between the controller 106 and the wrist of user 102.

In particular embodiments, upper body pose 205 may be inferred based on the plurality of poses, for example and not by way of limitation, a head pose 210 or a wrist pose 220. In particular embodiments the upper body pose 205 may be inferred by a non-linear kinematic optimization solver ("non-linear solver") to infer one or more joint poses that comprise upper body pose 205. In particular embodiments the non-linear solver may comprise a C++ library built for inverse kinematics with a large set of common error functions that cover a wide range of applications. In particular embodiments the non-linear solver may provide one or more helper functions for tasks that are usually related to global inverse kinematics problems (e.g., joint and skeleton structures, meshes and linear-blend skinning, error functions for common constraints) or one or more helper functions for mesh deformations (e.g., Laplacian surface deformation) or one or more 10 functions for various file formats.

In particular embodiments the non-linear solver may infer one or more joint poses comprising upper body pose 205. The one or more joint poses comprising upper body pose 205 associated with user 102 inferred by the non-linear solver may comprise a kinematic hierarchy at a particular time or state which is stored as a list of one or more joint poses. In particular embodiments the non-linear solver may include one or more basic solvers supported to infer the pose of one or more joints comprising upper body pose 205, for example and not by way of limitation a L-BFGS or a Gauss-Newton solver. In particular embodiments the non-linear solver may utilize a skeletal solver function to solve for a single frame of inverse kinematics (a single body pose). For example, the skeletal solver function may take a current one or more parameters (e.g., a joint pose) set as an input and optimize the activated subset of parameters given the defined error functions. The convention of the non-linear solver is to minimize the error value of the current function (e.g., the skeletal solver function) to infer an accurate upper body pose 205.

In particular embodiments the non-linear solver may represent the one or more joints poses through, for example and not by way of limitation, a subset of parameters that represent a position or orientation of each joint in an upper body pose 205. In particular embodiments the non-linear solver may parametrize each joint pose by 7 degrees of freedom: 3 translation values (e.g., x, y, z), 3 rotation values (e.g., Euler angles in radians), and 1 uniform scale value. In particular embodiments these parameters may be represented using one or more coordinate systems, for example and not by way of limitation, via an absolute global coordinate system (e.g., x, y, z) or via a localized coordinate system relative to a parent joint, for example and not by way of limitation, a head joint.

In particular embodiments the non-linear solver may assign one or more variable limits for each joint pose parameter (e.g., a minimum or maximum value). In particular embodiments the non-linear solver may assign predetermined static weights to each joint pose parameter. These predetermined static weights may be determined, for example and not by way of limitation, based on the accuracy of the sensor data used to determine the value of each variable. For example, the joint pose parameters representing the head pose 210 and wrist pose 220 associated with user 102 may be assigned a higher static weight because they are determined with more accurate methods, such as SLAM techniques as described herein, than one or more other joint poses or variables within a joint pose parameter. In particular embodiments, the non-linear solver may use the joint parameters and predetermined static weights to infer an upper body pose 205, which infers the most likely poses of one or more joints of user 102 at a particular time or state.

While these techniques, utilized either alone or in combination, typically allow for reliable determination of the upper body pose 205 and associated joints that comprise upper body pose 2015 (e.g., the head pose 210, wrist pose 220, elbow pose 230, etc.), these techniques may be unreliable and inaccurate for determining lower body pose 215 and the associated joints that comprise lower body pose 215 (e.g., a hip pose 280, a knee pose 290, an ankle pose 295, etc.). Due to user 102 only wearing headset 104 and one or more controllers 106, limitations may exist in the sensor or image data associated with artificial reality system 100. For example, image data captured from one or more cameras 110 may not contain at least a portion of the lower body of user 102, resulting in little information with which to determine or generate an accurate lower body pose 215 associated with user 102.

Figure 3:
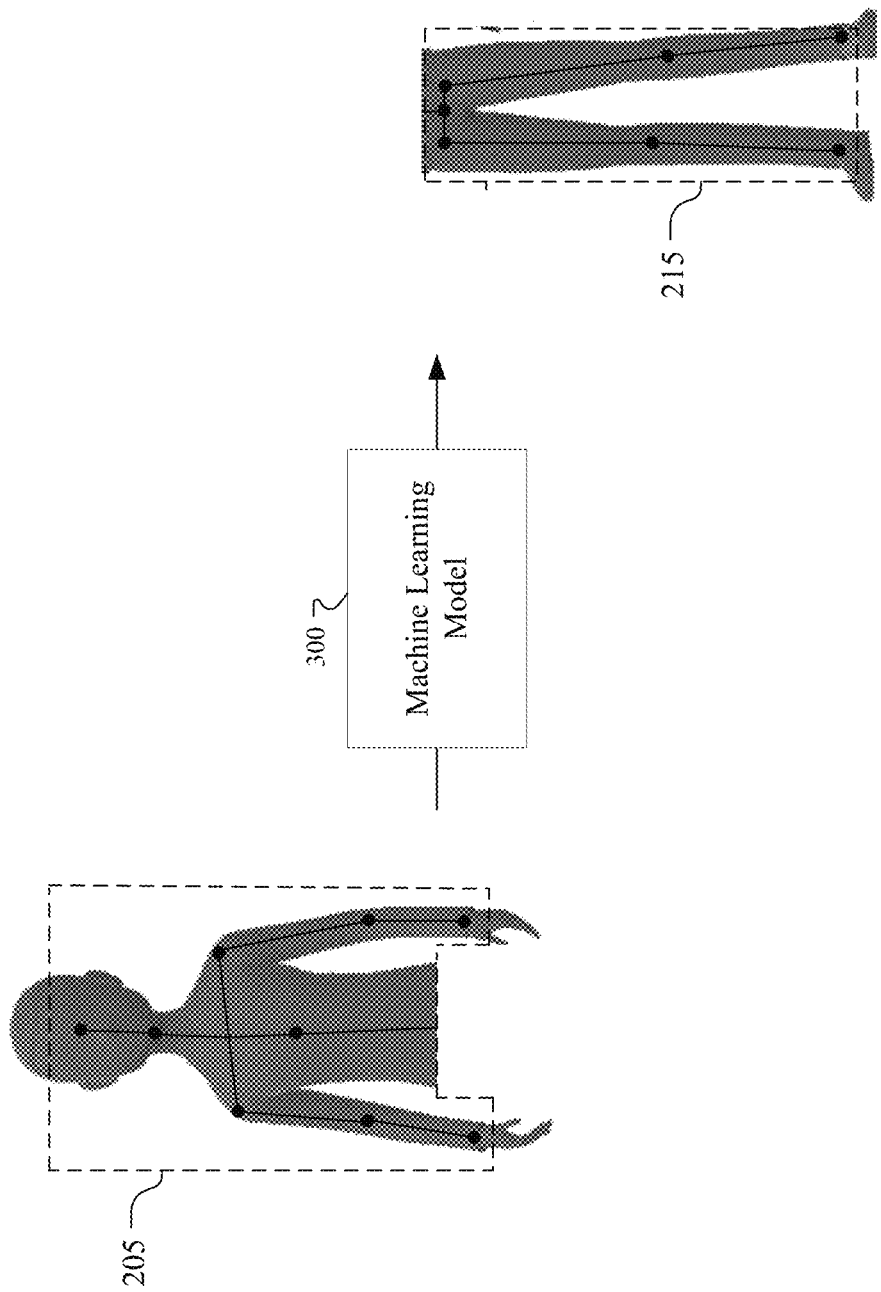
FIG. 3 illustrates an example of generating a lower body pose utilizing a known predicted upper body pose using a machine-learning model.

To remedy this problem, in particular embodiments computing system 108 may utilize one or more techniques described herein to generate a lower body pose 215 of the user 102. In particular embodiments the lower body pose 215 may be generated by processing the upper body pose 205 using a machine-learning model. FIG. 3 illustrates an example of generating a lower body pose utilizing an inputted upper body pose. In particular, FIG. 3 illustrates an inputted upper body pose 205 associated with a user 102 of artificial reality system 100 generated using the methods described herein and received by machine-learning model 300. In particular embodiments, the machine-learning model 300 may be based on a Generative Adversarial Network (GAN). Using particular embodiments described herein, machine-learning model 300 may utilize upper body pose 205 to generate a lower body pose 215. In particular embodiments, the computing system may combine the generated upper body pose 205 with the generated lower body pose 215 to generate a full body pose in lieu of or in addition to the lower body pose 215 generated by the machine-learning model.

Figure 4:
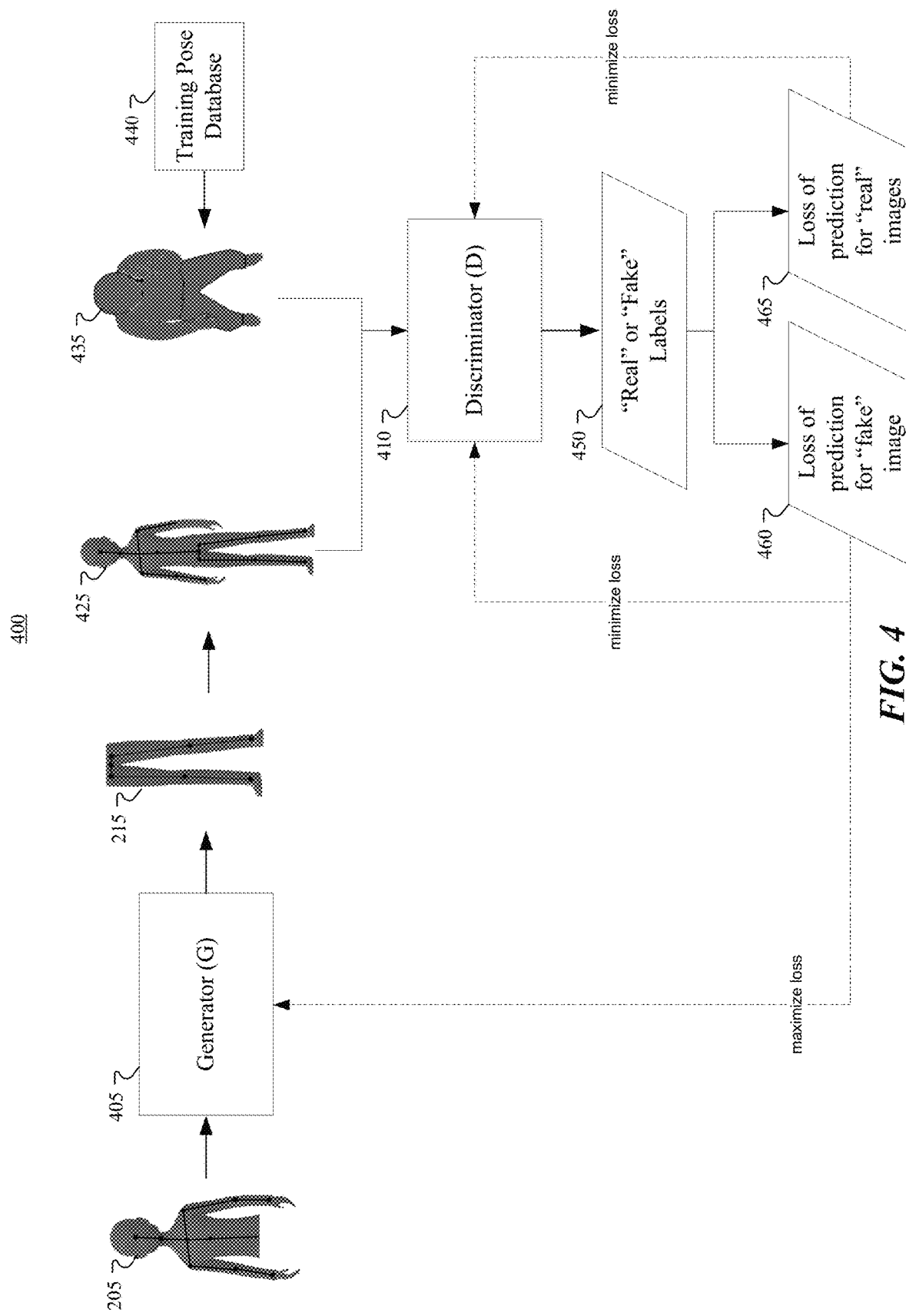
FIG. 4 illustrates a configuration for training a machine-learning model for lower body pose prediction.

FIG. 4 illustrates a configuration for training a Generative Adversarial Network (GAN) 400 for pose prediction. GAN may include two separate neural networks, a Generator 405 (interchangeably referred to as "G" herein) and a Discriminator 410 (interchangeably referred to as "D" herein). In particular embodiments, the Generator 405 and the Discriminator 410 may be implemented as, for example and not by way of limitation, a neural network, although any network architecture suitable for the operations described herein may be utilized. At a high level, the Generator 405 may be configured to receive as input a generated upper body pose 205 and output a generated lower body pose 215. In particular embodiments the upper body pose 205 may be combined with the lower body pose 215 to generate a full body pose 425. In particular embodiments the Discriminator 410 may be configured to discriminate between "fake" full body poses 425 (those comprising lower body poses outputted by the Generator 405) and "real" training lower body poses 435 from a training pose database 440 that are not generated by Generator 405. In particular embodiments, the one or more training full body poses 435 may comprise full body poses from one or more images. The Generator 405 and the Discriminator 410 may be considered as adversaries, because the objective of the Generator 405 is to generate fake poses that would fool the Discriminator 410 (in other words, to increase the Discriminator's 410 error rate), and the objective of the Discriminator 410 is to correctly distinguish "fake" poses from the Generator 405 and "real" poses. In particular embodiments, the machine-learning model (e.g., the Generator 405) is optimized during training to cause a second machine-learning model (e.g., the Discriminator 410) to incorrectly determine that a given full body pose, generated using the machine-learning model, is unlikely generated using the machine-learning model.

In particular embodiments, each training full body pose 435 in the training pose dataset may be "real" poses in the sense that they were not generated, either in whole or in part, by the model 400. In particular embodiments, each training full body pose 435 may be automatically obtained by retrieving different poses of a person from an pose database, wherein each of the different poses comprise a full body pose 435 of the person. These "real" training full body poses 435 serve as ground truths to train the Discriminator 410 network to identify which full body poses are "real" and which are "fake". The training full body pose 435 may also depict a person, for example and not by way of limitation, sitting, standing, or kneeling, or in another posture that is the same or differs from the generated upper body pose 205 or the generated lower body pose 215 outputted by the Generator 405. The randomness in the poses helps the trained machine-learning model 400 to be more robust, since in operation it may be unknown what kind of body poses the machine-learning model 400 would be asked to process.

In particular embodiments, training of the machine-learning model 200 may be performed simultaneously, or in stages. For example, a first stage may be for training the Generator 405, a second stage may be for training the Discriminator 410 based on the outputs of the Generator 405, and a third stage may be for retraining/refining the Generator 405 to better "fool" the trained Discriminator 410. As another example, the training of Generator 405 and Discriminator 410 may occur simultaneously.

In particular embodiments, the Generator 405 may be configured to receive an upper body pose 205 and generate a temporal sequence of lower body poses 215, for example, a sequence of lower body poses of a user standing, sitting, or walking. Rather than generate a single lower body pose 215, the Generator 405 may generate a temporal sequence of lower body poses that may be combined with a corresponding upper body pose to generate a temporal sequence of full body poses. In particular embodiments the Discriminator 410 may be configured and trained to determine whether an inputted sequence of poses is temporally consistent, and thus discriminate between a "fake" temporal sequence of full body poses (those comprising a temporal sequence of lower body poses outputted by the Generator 405) and a "real" temporal sequence of training lower body poses from a training pose database 440 that are not generated by Generator 405. In particular embodiments, the temporal sequence of training full body poses may comprise full body poses from one or more images. In this temporal GAN the Generator 405 and the Discriminator 410 may be considered as adversaries, because the objective of the Generator 405 is to generate temporal sequences of fake poses that would fool the Discriminator 410 (in other words, to increase the Discriminator's 410 error rate), and the objective of the Discriminator 410 is to correctly distinguish "fake" temporal sequences of full body poses from the Generator 405 and "real" temporal sequences of full body poses. Once trained, the temporal Generator can be trained to output a realistic temporal sequence of lower body poses given an inputted upper body pose 205. While this disclosure, for readability and clarity, primarily describes training and utilizing only one pose at a time using the methods described herein, the GAN may instead be trained and utilized to output a temporal sequence of lower body poses using the same methods described herein.

Figure 5:
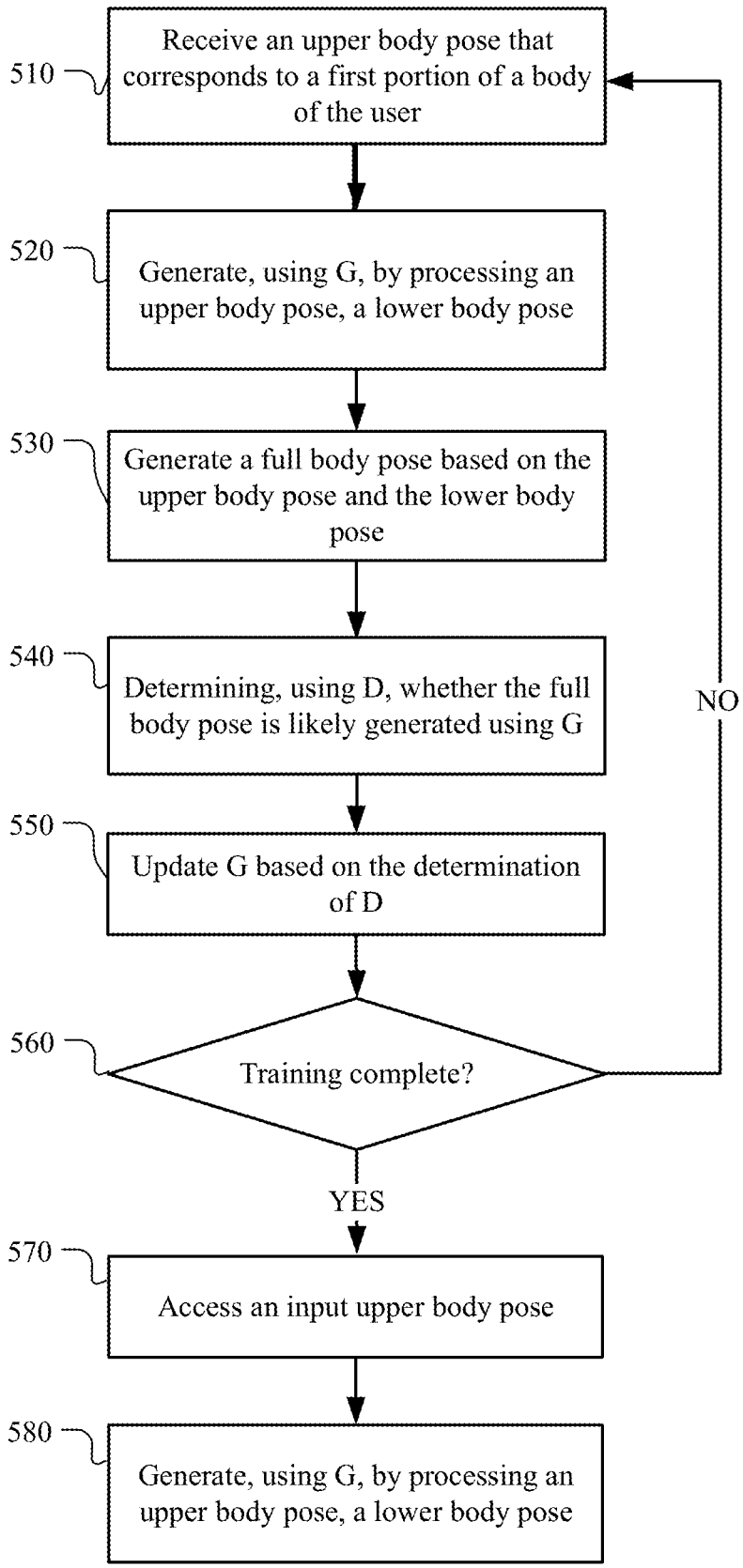
FIG. 5 illustrates an example method for training a Generator.

FIG. 5 illustrates an example method 500 for training a Generator based on a loss, in accordance with particular embodiments. At a high level, during the training the Generator 405, the parameters of the Generator 405 may be iteratively updated based on a comparison between the generated "fake" full body pose 425 (which comprises lower body pose 215 generated by the Generator) and the corresponding training full body pose 435. An objective of training is to maximize the loss 460 of prediction for "fake" poses. In doing so, the goal is to have the Generator 405 learn how to generate, based on an upper body pose 205, upper body poses 215 that can be used to generate a "fake" full body pose 425 that looks sufficiently "real."

The method may begin at step 510, where a computing system may receive an upper body pose 205 that corresponds to a first portion of a body of user 102, the first portion of the body comprising a head and arm of user 102. The upper body pose 205 inputted into the Generator 405 may be an upper body pose generated based on sensor data and/or image data using one or more techniques described herein, or the upper body pose 205 inputted into the Generator 405 may be an upper body pose extracted from one or more real images of a person.

At step 520, the machine-learning model may generate, by processing the upper body pose 205, a lower body pose 215 that corresponds to a second portion of the body of user 102, the second portion of the body comprising a leg of user 102. In particular embodiments the Generator 405 may generate the lower body pose 215 based on the received upper body pose 205. In particular embodiments the generated lower body pose 215 corresponds to a second portion of the body comprising a leg of the user. The generated lower body pose 215 may be used to generate a "fake" full body pose 425 that comprises the generated lower body pose 215.

In particular embodiments the computing system may determine contextual information associated with the artificial reality system 100. In particular embodiments, the Generator may receive the contextual information. The Generator 405 may utilize this contextual information for generating lower body poses. This contextual information may be associated with a particular time at which the sensor data and/or image data was captured. For example and not by way of limitation, the contextual information may comprise information about whether user 102 is sitting or standing. In another example, the contextual information may comprise information about an application the user is interacting with when the upper body pose is determined, for example and not by way of limitation, an artificial reality application (e.g., whether the user is interacting with application associated with a business meeting, or if they are interacting with an application associated with a game, such as a dance contest). In particular embodiments, the Generator 405 may receive one or more contextual information associated with the artificial reality system 100. In particular embodiments, the lower body pose 215 is generated by further processing the contextual information using the machine-learning model.

In particular embodiments, the computing system may determine one or more physical constraints associated with an upper body pose or lower body pose, using for example, a physics aware data augmentation method. The Generator 405 may receive and utilize one or more of these physical constraints to generate more realistic lower body poses, or a more realistic temporal sequence of lower body poses. These physical constraints may be associated with one or more joint poses of the user, for example and not by way of limitation, a physical limitation on the possible range of motion for a knee joint pose that simulates one or more physical limitations of the human body. In particular embodiments, the computing system may determine one or more physical constraints when generating a temporal sequence of lower body poses. For example and not by way of limitation, the computing system may determine temporal limitations on the rate of acceleration or jitter of one or more joints between one or more sequential poses in a temporal sequence of poses. In particular embodiments, the Generator 405 may use this constraint to determine a more realistic temporal sequence of lower body poses.

Figure 6:
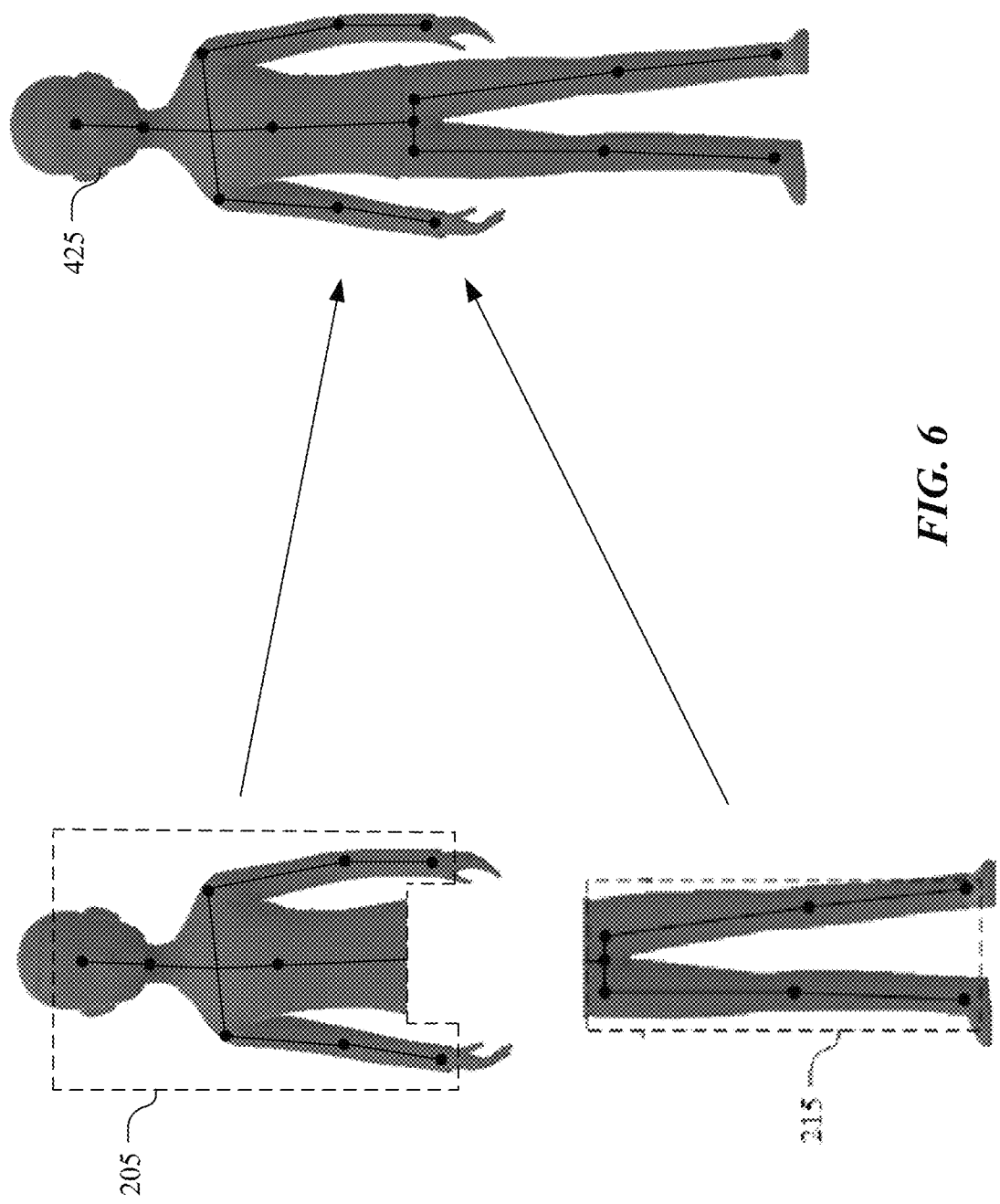
FIG. 6 illustrates generating a full body pose from a generated upper body pose and a generated lower body pose.

At step 530, the system may generate, based on the upper body pose 205 and the lower body pose 215, a full body pose 425. FIG. 6 illustrates generating a full body pose from a generated upper body pose and a generated lower body pose. In particular embodiments, the upper body pose 215 is generated using the methods described herein and corresponds to a first portion of a body of a user, the first portion of the body comprising a head and arm of a user. In particular embodiments, the lower body pose 215 is generated using the methods described herein and corresponds to a second portion of the body of a user, the second portion of a body comprising a leg of the user. In particular embodiments, full body pose 425 may generated by the machine-learning model 400. In particular embodiments, full body pose 425 may be generated by the computing system in a post-processing step.

At step 540, the system may determine, using the Discriminator 410, whether the full body pose 425 is likely generated using the lower body pose 215 generated by the Generator 405 (i.e., whether it is "fake" or "real"). In particular embodiments, the goal of training the Discriminator is to have it learn how to correctly discriminate between "real" and "fake" full body poses. For example, for each full body pose, the Discriminator 410 may output a value between 0 and 1 that represents a confidence or probability/likelihood of the pose being generated by the Generator (i.e., "fake"). For instance, a value closer to 1 may indicate a higher probability/confidence that the pose is "real" (i.e., not generated by the Generator) and a value closer to 0 may indicate a lower probability/confidence that the pose is "real" (which implicitly means a higher probability/confidence that the pose is "fake"). These predictions may be compared to known labels of the poses that indicate which are "fake" and which are "real."

In particular embodiments, the system may compute a loss based on D's determination of whether the full body pose is likely generated using the lower body pose 215 generated by the Generator 405. For instance, the loss may be computed based on a comparison of the prediction (e.g., confidence/probability score) made by the Discriminator and the known label (which may be an implicit label) of the full body pose being "fake." In particular embodiments, for a given pose, the prediction of the Discriminator 410 (represented as an output a value between 0 and 1 that represents a confidence or probability/likelihood of the pose being generated by the Generator 405) may be compared to known labels of the poses that indicate which are "fake" and which are "real." For example, if a full body pose is known to be "fake," a prediction that is closer to 1 may result in a higher loss and a prediction that is closer to 0 may result in a lower loss. The loss, in other words, may be a measure of the correctness of the Discriminator's 410 predictions.

At step 550, the system may then update the Generator based on the loss. The parameters of the Generator may be updated with the goal of maximizing the loss outputted by Discriminator 410. Since the Generator's objective is to "fool" the Discriminator in thinking that the full body poses generated using the lower body pose 215 generated by the Generator are "real," the training algorithm may be configured to optimize the loss. In other words, the Generator's parameters would be updated with the goal optimizing the Generator to generate lower body poses (that are then utilized to generate a full body pose) that would cause the loss of the Discriminator's prediction to increase (i.e., to increase its incorrect predictions that a given full body pose, generated using the lower body pose 215 generated by the Generator 405, is unlikely generated using the Generator 405).

Then at step 560, the system may determine whether the training of Generator 405 is complete. In particular embodiments the system may determine whether the training is complete based on one or more termination criteria. For example, if the loss is below a predetermined threshold and/or if its changes over the last several iterations have stabilized (e.g., fluctuated within a predetermined range), then the system may determine that training is complete. Alternatively or additionally, training may be deemed complete if a predetermined number of training iterations have been completed or if a predetermined number of training samples have been used. In the event training is not yet complete, the system may, in particular embodiments, repeat the process starting from step 510 to continue training the Generator. If it is instead determined that training is complete, then the Trained Generator may be used in operation.

The training objective is for the Generator 405 to learn to generate poses 215 that would fool the Discriminator 410 in thinking the poses are "real." In particular embodiments, the Generator 405 may generate a lower body pose 215 and the Discriminator 410 may predict a likelihood of the resulting full body pose 425 being "real" or "fake" 450. If a high predicted value represents the Discriminator 410 thinking that the pose is more likely to be "real," then the objective of the training may be expressed in terms of maximizing the Discriminator's 410 predicted value for the "fake" full body pose 215. If the Discriminator's 410 prediction correctness for the "fake" full body pose 215 is represented as a loss 460, then the objective of the training may be expressed in terms of maximizing that loss 460. Based on the loss function and training objective, the parameters of the Generator 405 may be iteratively updated after each training so that the Generator 405 becomes better at generating lower body poses 215 that could "fool" the Discriminator 410. Thus, once trained, the Generator 405 may be used to process a given upper body pose and automatically generate a realistic lower body pose.

Returning to FIG. 4, while the Generator 405 is being trained, it may be used to simultaneously train the Discriminator 410 in accordance with particular embodiments. At a high level, the Generator 405 may process a given upper body pose 205 and generate a lower body pose 215. The computing system may utilize the upper body pose 205 and the lower body pose 215 to generate a full body pose 425. The generated full body pose 425, along with one or more training full body poses 435 from a training pose database 440 may be provided as input to the Discriminator 410.

Figure 7:
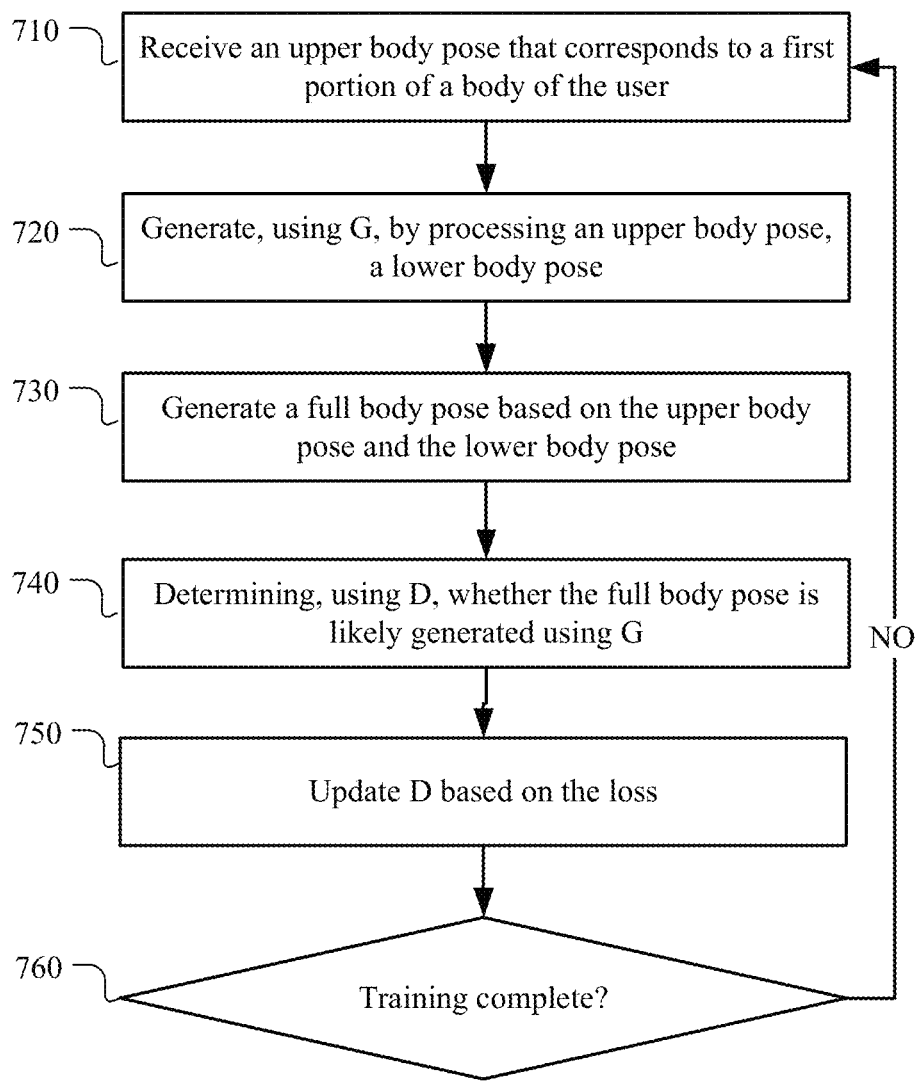
FIG. 7 illustrates an example method for training a Discriminator.

FIG. 7 illustrates an example method 700 for training a Discriminator 410. In particular embodiments, the Generator 405 may be used to train the Discriminator 410. In particular embodiments, the Generator 405 and the Discriminator 410 may be trained simultaneously. The Discriminator 410 may be tasked with processing the input poses (e.g., the "fake" full body pose 425, and the "real" training full body pose 435) and predicting which are "real" and which are "fake" 450. Conceptually, the goal of training the Discriminator 410 may be to maximize the Discriminator's 410 prediction values for the generated full body pose 425 and the training full body pose 435, and minimize the Discriminator's 410 prediction value for the generated full body pose 425. In other words, if the Discriminator's 410 prediction correctness for the "fake" pose (e.g., the generated full body pose 425) and the "real" poses (i.e., the training full body pose 435) are represented as losses 460 and 465, respectively, the goal of training the Discriminator 410 would be to minimize the losses (i.e., minimize the incorrect predictions). Based on the loss function and training objective, the parameters of the Discriminator 410 may be iteratively updated after each prediction so that the Discriminator 410 becomes better at discriminating between "real" and "fake" full body poses.

The method may begin at step 710, where a computing system may receive an upper body pose 205 that corresponds to a first portion of a body of user 102, the first portion of the body comprising a head and arm of user 102. The upper body pose 205 inputted into the Generator 405 may be an upper body pose generated based on sensor data and/or image data using one or more techniques described herein, or the upper body pose 205 inputted into the Generator 405 may be an upper body pose extracted from one or more real images of a person. In particular embodiments step 710 may proceed similarly to step 510 described herein.

At step 720, the machine-learning model may generate, by processing the upper body pose 205, a lower body pose 215 that corresponds to a second portion of the body of user 102, the second portion of the body comprising a leg of user 102. In particular embodiments the Generator 405 may generate the lower body pose 215 based on the received upper body pose 205. In particular embodiments the generated lower body pose 215 corresponds to a second portion of the body comprising a leg of the user. In particular embodiments, the Generator 405 may generate the lower body pose 215 based on its current parameters, which may be iteratively updated during training so that the Generator gets better at generating realistic lower body poses. The generated lower body pose 215 may be used to generate a "fake" full body pose 425 that comprises the generated lower body pose 215. In particular embodiments step 720 may proceed similarly to step 520 described herein.

In particular embodiments the computing system may determine contextual information associated with the artificial reality system 100. In particular embodiments, the Generator may receive the contextual information. The Generator 405 may utilize this contextual information for generating lower body poses. This contextual information may be associated with a particular time at which the sensor data and/or image data was captured. For example and not by way of limitation, the contextual information may comprise information about whether user 102 is sitting or standing. In another example, the contextual information may comprise information about an application the user is interacting with when the upper body pose is determined, for example and not by way of limitation, an artificial reality application (e.g., whether the user is interacting with application associated with a business meeting, or if they are interacting with an application associated with a game, such as a dance contest). In particular embodiments, the Generator 405 may receive one or more contextual information associated with the artificial reality system 100. In particular embodiments, the lower body pose 215 is generated by further processing the contextual information using the machine-learning model.

At step 730, the system may generate, based on the upper body pose 205 and the lower body pose 215, a full body pose 425. In particular embodiments, full body pose 425 may generated by the machine-learning model 400. In particular embodiments, full body pose 425 may be generated by the computing system in a post-processing step. In particular embodiments step 730 may proceed similarly to step 530 described herein.

At step 740, the system may determine, using the Discriminator 410, whether the full body pose 425 is likely generated using the lower body pose 215 generated by the generated using the Generator 405 (i.e., whether it is "fake" or "real"). In particular embodiments, the goal of training the Discriminator is to have it learn how to correctly discriminate between "real" and "fake" full body poses. For example, for each full body pose, the Discriminator 410 may output a value between 0 and 1 that represents a confidence or probability/likelihood of the pose being generated by the Generator (i.e., "fake"). For instance, a value closer to 1 may indicate a higher probability/confidence that the pose is "real" (i.e., not generated by the Generator) and a value closer to 0 may indicate a lower probability/confidence that the pose is "real" (which implicitly means a higher probability/confidence that the pose is "fake"). These predictions may be compared to known labels of the poses that indicate which are "fake" and which are "real." In particular embodiments step 740 may proceed similarly to step 540 described herein.

In particular embodiments, the system may compute a loss based on the Discriminator's determination of whether the full body pose is likely generated using the lower body pose 215 generated by the generated by the Generator 405. For instance, the loss may be computed based on a comparison of the prediction (e.g., confidence/probability score) made by the Discriminator and the known label (which may be an implicit label) of the full body pose being "fake." In particular embodiments, for a given pose, the prediction of the Discriminator 410 (represented as an output a value between 0 and 1 that represents a confidence or probability/likelihood of the pose being generated by the Generator 405) may be compared to known labels of the poses that indicate which are "fake" and which are "real." For example, if a full body pose is known to be "fake," a prediction that is closer to 1 may result in a higher loss and a prediction that is closer to 0 may result in a lower loss. The loss, in other words, may be a measure of the correctness of the Discriminator's 410 predictions.

At step 750, the system may then update the Discriminator based on the loss. The parameters of the Discriminator 410 may be updated with the goal of minimizing the loss outputted by the Discriminator. In particular embodiments, these losses may be back-propagated and used by the training algorithm to update the parameters of the Discriminator 410 so that, over the course of the training, the Discriminator would progressively become better at discriminating between "fake" versus "real" poses. The goal of the training algorithm may be to minimize the losses (i.e., minimize the incorrect predictions).

Then at step 760, the system may determine whether the training of Discriminator 405 is complete. In particular embodiments the system may determine whether the training is complete based on one or more termination criteria. For example, if the loss is below a predetermined threshold and/or if its changes over the last several iterations have stabilized (e.g., fluctuated within a predetermined range), then the system may determine that training is complete. Alternatively or additionally, training may be deemed complete if a predetermined number of training iterations have been completed or if a predetermined number of training samples have been used. In the event training is not yet complete, the system may, in particular embodiments, repeat the process starting from step 710 to continue training the Discriminator.

Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for training a Discriminator, including the particular steps of the method of FIG. 7, this disclosure contemplates any suitable method for training a Discriminator, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Returning to FIG. 5, once the Generator 405 has been trained, it can be configured to receive an input upper body pose 205 and generate a lower body pose 215. After training, the pose would be realistic, such that when combined with the upper body pose 205 the computing system would generate a realistic full body pose 425. Further, once the Generator is trained, it may be used to generate lower body poses based on any inputted upper body pose (in other words, it is not limited to generating lower body poses based on poses that appeared in the training pose dataset). The trained Generator may also be distributed to different platforms different from the training system, including, for example, users' mobile devices or other personal computing devices.

At step 570 the Trained Generator may access an upper body pose 205. The upper body pose 205 may correspond to a first portion of a body of user 102, the first portion of the body comprising a head and arm of user 102. The upper body pose 205 inputted into the Trained Generator may be an upper body pose generated based on sensor data using one or more techniques described herein, or the upper body pose 205 inputted into the Trained Generator 405 may be an upper body pose from one or more real images of a person.

Then at step 580, the Trainer Generator may generate a lower body pose that corresponds to a second portion of the body of the user. The lower body pose may correspond to a second portion of the body of user 102, the second portion of the body comprising a leg of user 102. In particular embodiments the Trained Generator may generate the lower body pose 215 based on the received upper body pose 205. In particular embodiments the generated lower body pose 215 corresponds to a second portion of the body comprising a leg of the user.

In particular embodiments, the trained Generator may also receive and process contextual information specifying further information for generating an accurate lower body pose 215. In particular embodiments the contextual information may be associated with a time at which the sensor data is captured that was used to generate upper body pose 205. For example, the Generator may receive contextual information comprising an application the user 102 was interacting with when sensor data was captured, such as a virtual reality application used for virtual business meetings. Based on this information, the trained Generator 405 may be more likely to generate a lower body pose 215 that is typical of a user sitting or standing in a workplace setting.

Returning to FIG. 6, In particular embodiments the computing system may generate based on the upper body pose 205 and the lower body pose 215, a full body pose 425. In particular embodiments, full body pose 425 may be generated by the machine-learning model 400. In particular embodiments, full body pose 425 may be generated by the computing system in a post-processing step. In particular embodiments, this full body pose 425 may be utilized for a variety of applications. For example, computing system 108 may utilize fully body pose 425 to generate an avatar of user 102 in a virtual reality or artificial reality space. In particular embodiments the computing system 108 may only utilize a portion of the full body pose 425 for various applications, for example and not by way of limitation, an upper body pose (e.g., from the user's head to the user's hip) or the inferred pose of only one or more joints (e.g. an elbow joint 230, or a knee joint 290).

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for training a generator based on encoded representations of features, including the particular steps of the method of FIG. 5, this disclosure contemplates any suitable method for training a generator, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for training a generator based on recurrence loss, including the particular steps of the method of FIG. 4, this disclosure contemplates any suitable method for for training a generator based on recurrence loss, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 8:
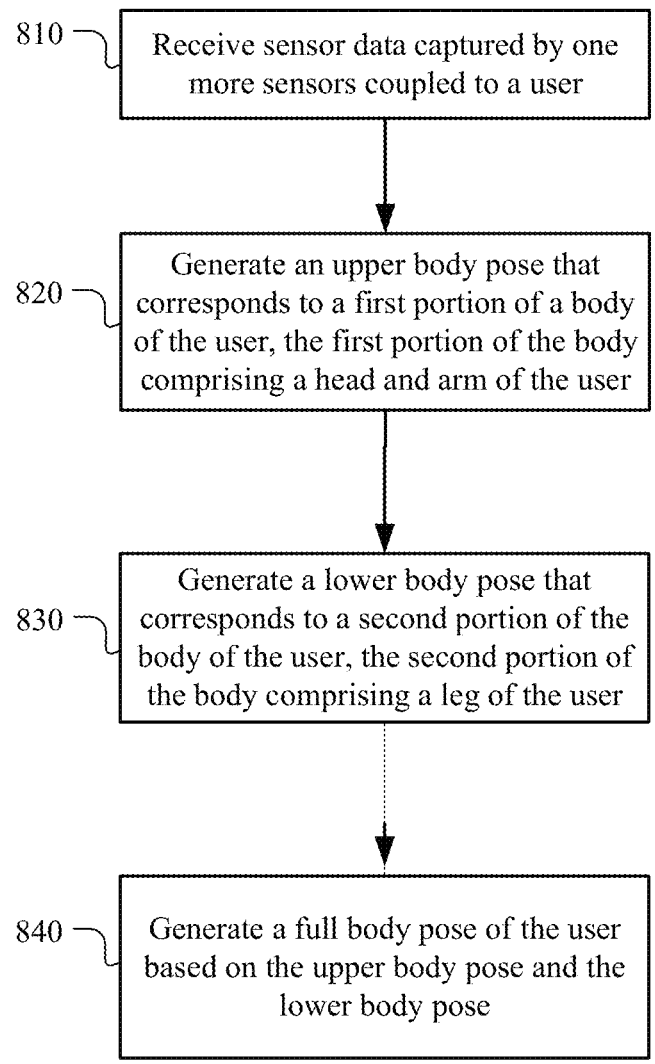
FIG. 8 illustrates an example method for generating a full body pose of the user based on an upper body pose and a lower body pose.

FIG. 8 illustrates an example method 800 for generating a full body pose of the user based on an upper body pose and a lower body pose. The method may begin at step 810, where a computing system may receive sensor data captured by one more sensors coupled to a user. In particular embodiments the one or more sensors may be coupled to user 102. In particular embodiments, the one or more sensors may be associated with the headset 104 worn by the user. For example and not by way of limitation, the headset 104 may include a gyroscope or inertial measurement unit that tracks the user's real-time movements and output sensor data to represent or describe the movement. As another example and not by way of limitation, the one or more controllers 106 may include inertial measurement units (IMUS) and infrared (IR) light emitting diodes (LEDs) configured to collect and send IMU sensor data to the computing system 108. As another example, the sensor data may comprise one or more image data from one or more components of artificial reality system 100.

At step 820, the computing system may generate an upper body pose that corresponds to a first portion of a body of the user, the first portion of the body comprising a head and arm of the user. In particular embodiments the computing system may utilize sensor data to generate the upper body pose. In particular embodiments, computing system 108 may determine a plurality of poses corresponding to a plurality of predetermined body parts of user 102, for example and not by way of limitation, a joint pose (e.g., a head pose 210 or a wrist pose 220). In particular embodiments one or more joint poses comprising the upper body pose 200 may be determined or inferred using a combination of one or more techniques, for example and not by way of limitation localization techniques (e.g., SLAM), machine-learning techniques (e.g., a neural network), known spatial relationships with one or more artificial reality system components (e.g., a known spatial relationship between headset 104 and head pose 210), visualization techniques (e.g., image segmentation), or optimization techniques (e.g., a non-linear solver).

At step 830, the computing system may generate a lower body pose that corresponds to a second portion of the body of the user, the second portion of the body comprising a leg of the user. In particular embodiments, the computing system may utilize a machine-learning model to generate the lower body pose, for example and not by way of limitation, a Generative Adversarial Network (GAN) comprising a Generator network and a Discriminator Network. In particular embodiments, the Generator may receive contextual information associated with the upper body pose. The Generator may utilize this contextual information for generating lower body poses. This contextual information may be associated with a particular time at which the sensor data and/or image data was captured.

At step 840, the computing system may generate a full body pose of the user based on the upper body pose and the lower body pose. In particular embodiments, full body pose may be generated by the machine-learning model. In particular embodiments, full body pose may be generated by the computing system in a post-processing step. In particular embodiments, this full body pose may be utilized for a variety of applications. For example, computing system may utilize fully body pose to generate an avatar of user in a virtual reality or artificial reality space.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a full body pose of the user based on an upper body pose and a lower body pose, including the particular steps of the method of FIG. 8, this disclosure contemplates any suitable method for generating a full body pose of the user based on an upper body pose and a lower body pose, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
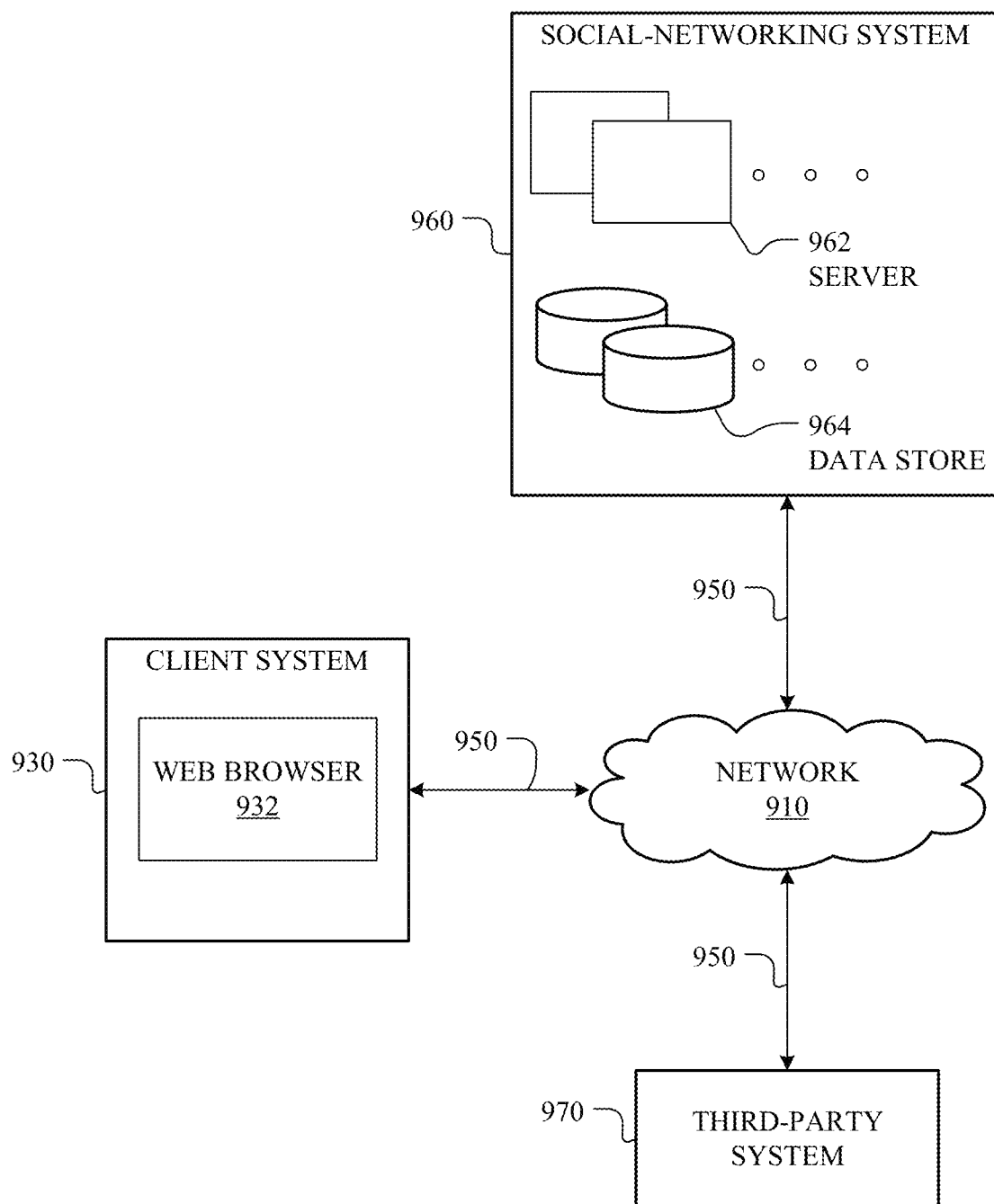
FIG. 9 illustrates an example network environment associated with a social-networking system.

FIG. 9 illustrates an example network environment 900 associated with a social-networking system. Network environment 900 includes a client system 930, a social-networking system 960, and a third-party system 970 connected to each other by a network 910. Although FIG. 9 illustrates a particular arrangement of client system 930, social-networking system 960, third-party system 970, and network 910, this disclosure contemplates any suitable arrangement of client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple client system 930, social-networking systems 960, third-party systems 970, and networks 910.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

In particular embodiments, client system 930 may be an electronic device including hardware, software, or embedded logic components or a combination of two or more such components and capable of carrying out the appropriate functionalities implemented or supported by client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 930. A client system 930 may enable a network user at client system 930 to access network 910. A client system 930 may enable its user to communicate with other users at other client systems 930.

In particular embodiments, client system 930 may include a web browser 932, and may have one or more add-ons, plug-ins, or other extensions. A user at client system 930 may enter a Uniform Resource Locator (URL) or other address directing the web browser 932 to a particular server (such as server 962, or a server associated with a third-party system 970), and the web browser 932 may generate a Hyper Text Transfer Protocol (HTTP) request and communicate the HTTP request to server. The server may accept the HTTP request and communicate to client system 930 one or more Hyper Text Markup Language (HTML) files responsive to the HTTP request. Client system 930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 960 may be a network-addressable computing system that can host an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. As an example and not by way of limitation, client system 930 may access social-networking system 960 using a web browser 932, or a native application associated with social-networking system 960 (e.g., a mobile social-networking application, a messaging application, another suitable application, or any combination thereof) either directly or via network 910. In particular embodiments, social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. Social-networking system 960 may provide users of the online social network the ability to communicate and interact with other users. In particular embodiments, users may join the online social network via social-networking system 960 and then add connections (e.g., relationships) to a number of other users of social-networking system 960 to whom they want to be connected. Herein, the term "friend" may refer to any other user of social-networking system 960 with whom a user has formed a connection, association, or relationship via social-networking system 960.

In particular embodiments, social-networking system 960 may provide users with the ability to take actions on various types of items or objects, supported by social-networking system 960. As an example and not by way of limitation, the items and objects may include groups or social networks to which users of social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 960 or by an external system of third-party system 970, which is separate from social-networking system 960 and coupled to social-networking system 960 via a network 910.

In particular embodiments, social-networking system 960 may be capable of linking a variety of entities. As an example and not by way of limitation, social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating social-networking system 960. In particular embodiments, however, social-networking system 960 and third-party systems 970 may operate in conjunction with each other to provide social-networking services to users of social-networking system 960 or third-party systems 970. In this sense, social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 960 also includes user-generated content objects, which may enhance a user's interactions with social-networking system 960. User-generated content may include anything a user can add, upload, send, or "post" to social-networking system 960. As an example and not by way of limitation, a user communicates posts to social-networking system 960 from a client system 930. Posts may include data such as status updates or other textual data, location information, photos, videos, links, music or other similar data or media. Content may also be added to social-networking system 960 by a third-party through a "communication channel," such as a newsfeed or stream.

In particular embodiments, social-networking system 960 may include a variety of servers, sub-systems, programs, modules, logs, and data stores. In particular embodiments, social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 960 may also include suitable components such as network interfaces, security mechanisms, load balancers, failover servers, management-and-network-operations consoles, other suitable components, or any suitable combination thereof. In particular embodiments, social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 960 to one or more client systems 930 or one or more third-party system 970 via network 910. The web server may include a mail server or other messaging functionality for receiving and routing messages between social-networking system 960 and one or more client systems 930. An API-request server may allow a third-party system 970 to access information from social-networking system 960 by calling one or more APIs. An action logger may be used to receive communications from a web server about a user's actions on or off social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from client system 930 responsive to a request received from client system 930. Authorization servers may be used to enforce one or more privacy settings of the users of social-networking system 960. A privacy setting of a user determines how particular information associated with a user can be shared. The authorization server may allow users to opt in to or opt out of having their actions logged by social-networking system 960 or shared with other systems (e.g., third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
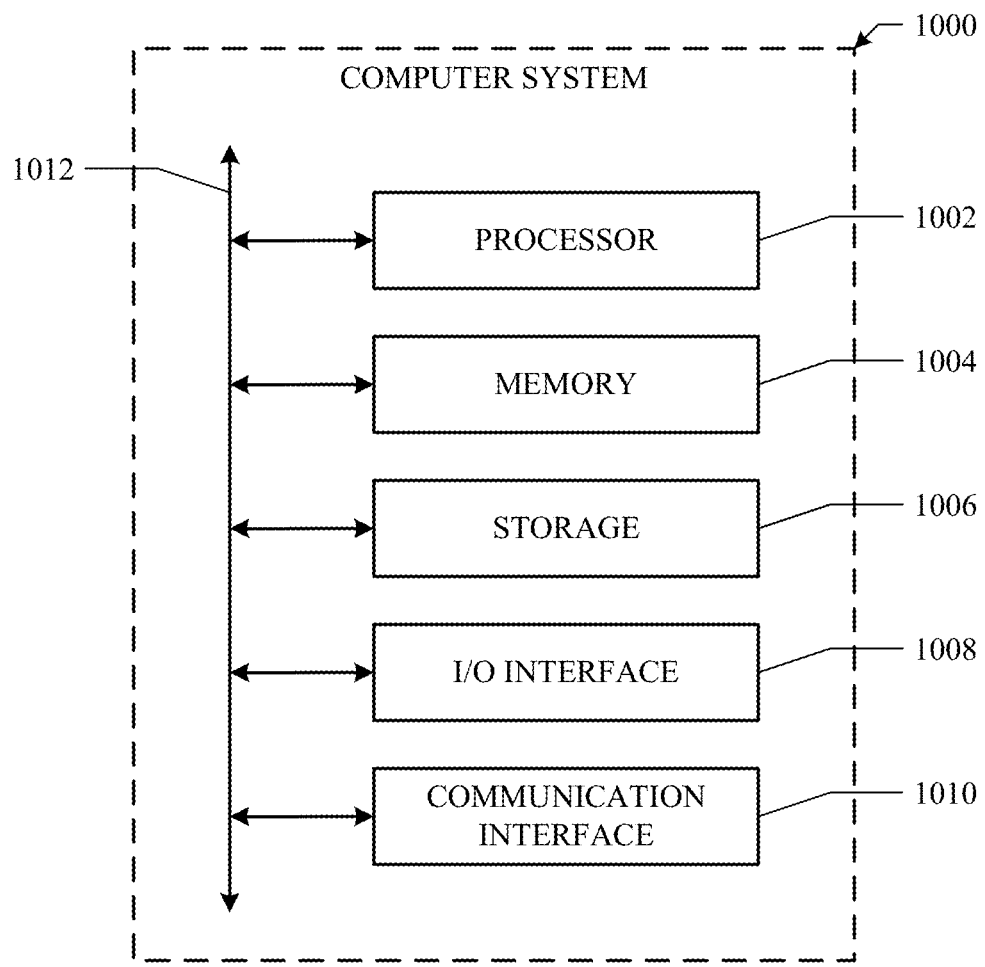
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
receiving sensor data captured by one or more sensors coupled to a user;
determining contextual information associated with a time at which the sensor data is captured;
generating, based on the sensor data, an upper body pose that corresponds to a first portion of a body of the user, the first portion of the body comprising a head and an arm of the user;
generating, by processing the upper body pose using a machine-learning model, a lower body pose that corresponds to a second portion of the body of the user, the second portion of the body comprising a leg of the user, wherein the lower body pose is generated by further processing the contextual information using the machine-learning model; and
generating a full body pose of the user based on the upper body pose and the lower body pose.

2. The method of claim 1, wherein the machine-learning model is trained using a second machine-learning model trained to determine whether a given full body pose is likely generated using the machine-learning model.

3. The method of claim 1, wherein the machine-learning model is optimized during training to cause a second machine-learning model to incorrectly determine that a given full body pose, generated using the machine-learning model, is unlikely generated using the machine-learning model.

4. The method of claim 1, wherein the machine-learning model is trained by:
generating, by processing a second upper body pose using the machine-learning model, a second lower body pose;
generating a second full body pose based on the second upper body pose and the second lower body pose;
determining, using a second machine-learning model, whether the second full body pose is likely generated using the machine-learning model; and
updating the machine-learning model based on the determination of the second machine-learning model.

5. The method of claim 1, wherein the one or more sensors are associated with a head-mounted device worn by the user.

6. The method of claim 1, wherein generating the upper body pose comprises:
determining, based on the sensor data, a plurality of poses corresponding to a plurality of predetermined body parts of the user; and
inferring the upper body pose based on the plurality of poses.

7. The method of claim 6, wherein the plurality of poses comprises a wrist pose corresponding to a wrist of the user, wherein the wrist pose is determined based on one or more images captured by a head-mounted device worn by the user, the one or more images depicting (1) the wrist of the user or (2) a device held by the user.

8. The method of claim 1, wherein the contextual information comprises an application the user is interacting with when the upper body pose is determined.

9. The method of claim 1, further comprising generating, based on the full body pose, an avatar of the user.

10. One or more computer-readable non-transitory storage media comprising software that is operable when executed by a server to:
receive sensor data captured by one or more sensors coupled to a user;
determine contextual information associated with a time at which the sensor data is captured;
generate, based on the sensor data, an upper body pose that corresponds to a first portion of a body of the user, the first portion of the body comprising a head and an arm of the user;
generate, by processing the upper body pose using a machine-learning model, a lower body pose that corresponds to a second portion of the body of the user, the second portion of the body comprising a leg of the user, wherein the lower body pose is generated by further processing the contextual information using the machine-learning model; and
generate a full body pose of the user based on the upper body pose and the lower body pose.

11. The media of claim 10, wherein generating the upper body pose comprises:
determining, based on the sensor data, a plurality of poses corresponding to a plurality of predetermined body parts of the user; and inferring the upper body pose based on the plurality of poses.

12. The media of claim 11, wherein the plurality of poses comprises a wrist pose corresponding to a wrist of the user, wherein the wrist pose is determined based on one or more images captured by a head-mounted device worn by the user, the one or more images depicting (1) the wrist of the user or (2) a device held by the user.

13. The media of claim 10, wherein the contextual information comprises an application the user is interacting with when the upper body pose is determined.

14. The media of claim 10, wherein the software is further operable when executed by the server to generate, based on the full body pose, an avatar of the user.

15. A system comprising:
one or more processors; and
one or more computer-readable non-transitory storage media coupled to one or more of the processors and comprising instructions operable when executed by one or more of the processors to cause the system to:
receive sensor data captured by one or more sensors coupled to a user;
determine contextual information associated with a time at which the sensor data is captured;
generate, based on the sensor data, an upper body pose that corresponds to a first portion of a body of the user, the first portion of the body comprising a head and an arm of the user;
generate, by processing the upper body pose using a machine-learning model, a lower body pose that corresponds to a second portion of the body of the user, the second portion of the body comprising a leg of the user, wherein the lower body pose is generated by further processing the contextual information using the machine-learning model; and
generate a full body pose of the user based on the upper body pose and the lower body pose.

16. The system of claim 15, wherein generating the upper body pose comprises:
determining, based on the sensor data, a plurality of poses corresponding to a plurality of predetermined body parts of the user; and
inferring the upper body pose based on the plurality of poses.

17. The system of claim 16, wherein the plurality of poses comprises a wrist pose corresponding to a wrist of the user, wherein the wrist pose is determined based on one or more images captured by a head-mounted device worn by the user, the one or more images depicting (1) the wrist of the user or (2) a device held by the user.

18. The system of claim 15, wherein the contextual information comprises an application the user is interacting with when the upper body pose is determined.

19. The system of claim 15, wherein the processors are further operable when executing the instructions to generate, based on the full body pose, an avatar of the user.

* * * * *